(12) United States Patent
Wallace et al.

(10) Patent No.: US 12,523,295 B2
(45) Date of Patent: Jan. 13, 2026

(54) CONNECTING ROD GUIDE (71) Applicant: Advanced Flow Solutions Inc., Oklahoma City, OK (US)

(72) Inventors: Blake A. Wallace, Mustang, OK (US); Keaton T. Whitaker, Oklahoma City, OK (US)

(73) Assignee: Advanced Flow Solutions Inc., Oklahoma City, OK (US)

( * ) Notice: Subject to any disclaimer, the term of this patent is extended or adjusted under 35 U.S.C. 154(b) by 0 days.

(21) Appl. No.: 18/958,318

(22) Filed: Nov. 25, 2024

(65) Prior Publication Data

US 2025/0180116 A1 Jun. 5, 2025

Related U.S. Application Data (60) Provisional application No. 63/604,337, filed on Nov. 30, 2023.

(51) Int. Cl.
*F16J 1/18* (2006.01)

(52) U.S. Cl.
CPC ..................... *F16J 1/18* (2013.01)

(58) Field of Classification Search
CPC ........................................................ F16J 1/18
See application file for complete search history.

(56) References Cited

U.S. PATENT DOCUMENTS

| | | | |
|---|---|---|---|
| 1,142,177 A * | 6/1915 | Kennedy | F16J 1/18 403/154 |
| 4,574,591 A * | 3/1986 | Bertsch | F16J 10/02 92/170.1 |
| 4,754,608 A * | 7/1988 | Bertsch | F16J 1/18 60/520 |
| 5,867,906 A | 2/1999 | Klassen | |

FOREIGN PATENT DOCUMENTS

DE 102004048939 A1 5/2005

OTHER PUBLICATIONS

The International Search Report and the Written Opinion of the International Searching Authority, or the Declaration from the related PCT Application No. PCT/US2024/057264, date of mailing Mar. 4, 2025, 13 pages.

* cited by examiner

*Primary Examiner* — Michael Leslie
(74) *Attorney, Agent, or Firm* — Tucker Ellis LLP; Michael G. Craig (57) ABSTRACT

One or more techniques and/or systems are disclosed for a mechanical assembly comprising a connecting rod with a first end and a second end, a crankshaft journal, a wrist pin, and at least one guide spacer. The crankshaft journal may be coupled to the first end of the connecting rod, allowing for the transmission of rotational forces. The wrist pin may be configured to attach to the second end of the connecting rod, facilitating the transfer of mechanical motion. At least one guide spacer may be positioned on the wrist pin, located on either side of the connecting rod at the second end, to provide alignment and reduce wear. The crankshaft journal and the wrist pin may be arranged in parallel, enabling the connecting rod to perform both rotational and reciprocating motions.

17 Claims, 11 Drawing Sheets

CONNECTING ROD GUIDE

CROSS-REFERENCE TO RELATED APPLICATIONS

This application claims priority to U.S. Provisional Patent Application Ser. No. 63/604,337, entitled CONNECTING ROD GUIDE, filed Nov. 30, 2023, which is incorporated herein by reference.

BACKGROUND

The present disclosure relates to mechanical assemblies used in various applications, particularly those involving dynamic motion transfer and conversion. Mechanical assemblies, in the context of engines and machinery, often use components that can efficiently transmit motion while maintaining structural integrity and reducing wear. Connecting rods, used in these assemblies, serve as links between moving parts, such as pistons and crankshafts. The effectiveness of these connecting rods can be a function of their design, the materials used, and their interaction with other components like crankshaft journals and wrist pins. These components should be able to withstand high stress and rotational speeds, and also provide precise alignment to reduce premature wear, and to maintain operational efficiency.

Historically, connecting rod assemblies have faced challenges in achieving a balance between durability and efficient motion transfer. Traditional designs often struggle with issues like misalignment, a need for frequent maintenance, excessive wear at connection points, and limited range of motion, leading to reduced operational life and efficiency. Furthermore, the need for assemblies that can accommodate both rotational and reciprocating motion is very useful in modern mechanical applications. Therefore, there is a continuous demand for improvements in connecting rod assemblies, aiming to enhance their functionality, durability, and versatility.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation of the present disclosure, a mechanical assembly may comprise a connecting rod with a first end and a second end, a crankshaft journal, a wrist pin, and at least one guide spacer. The crankshaft journal may be coupled to the first end of the connecting rod, allowing for the transmission of rotational forces. The wrist pin may be configured to attach to the second end of the connecting rod, facilitating the transfer of mechanical motion. At least one guide spacer may be positioned on the wrist pin, located on either side of the connecting rod at the second end, to provide for alignment and reduced wear. The crankshaft journal and the wrist pin may be arranged in parallel, enabling the connecting rod to perform both rotational and reciprocating motions.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

As illustrated in FIGS. 1A-4, connecting rods 1500 are commonly found in engines, compressors (e.g., 200), piston pumps, and other machinery. Connecting rods 1500 have two attachment points, one on each end, a first end 1505 and a second end 1506. The first end 1505 of the connecting rod (often referred to as the "big end") rotates 202 around a crankshaft journal 1600 and is subject to a circular motion 204 as the crankshaft 1790 rotates. The second end 1506 of the connecting rod 1500 (often referred to as the "small end") rocks back and forth 206 on a wrist pin 1100 and is subject to reciprocating motion 208. In effect, a connecting rod 1500 converts rotating motion 204 to reciprocating motion 208 (or vice versa) of the piston(s) 1000. Each end 1505, 1506 of the connecting rod 1500 uses a bearing 1700 or bushing 1400 of some sort.

Because the connecting rod 1500 rotates freely on both the crankshaft journal 1600 and the wrist pin 1100, for example, and because the journal axis 302 is parallel to the wrist pin axis 304, the connecting rod 1500 is free to slide back and forth axially 306 on the two parallel shafts. This axial movement 306 can be constrained to mitigate the bearings 1700, 1400 from running off their bearing surfaces, or to mitigate damage caused by undesired mechanical contact between the various moving parts or between moving parts 350 and stationary parts 352. In a typical engine or compressor, the use of pressurized oil lubrication can help mitigate mechanical contact and wear between moving parts, such as at the big end 1505 of the connecting rod 1500. This location is typically well lubricated by oil that is splashed or pumped under pressure to the connecting rod journal bearing 1700 through internal porting. Excess lubrication flows out the ends of the journal bearing 1700 and fully lubricates the contacting surfaces 350, 352 to mitigate wear and damage.

The connecting rod 1500 is attached to a crankshaft 1790 and both are rotating 202, 204 in relationship to one another. As such, there is typically a sliding motion between the two contacting surfaces 350, 352 of the connecting rod 1500 and crankshaft 1790. The contacting surfaces 350 on each side of the connecting rod 1500 help to keep the connecting rod 1500 positioned properly in the assembly used. Again, in an oil lubricated engine or compressor, for example, these sliding surfaces 350 are well lubricated. However, some gas compressors (and similar machines) are designed to be oil-less, meaning there is no oil in the machine. Instead, these machines use sealed (and permanently lubricated) bearings on the crankshaft 1790, crankshaft journal 1600, and wrist pin 1100. In an oil-less compressor, there is no lubrication freely available at the interface between the surfaces 350, 352 that provide axial location for the connecting rod 1500 in an oil lubricated machine. So the connecting rod's axial movement 306 can be restrained by another means.

In one aspect, an alternate means of positioning connecting rod (e.g., 1500) on its wrist pin (e.g., 1100) and crankshaft journal (e.g., 1600) is described herein. The described innovation allows for use of the connecting rods in an environment without lubrication, which mitigates movement of potentially sliding and moving parts. In some implementations, rather than finding and setting the position the connecting rod on the big end (e.g., 1505) where there is the potential for a constant sliding motion (e.g., 306) from the rotation (e.g., 202), the position for the connecting rod with regard to the wrist pin and crankshaft journal can be set at the small end (e.g., 1506) where there is only rocking motion (e.g., 206). In these implementations, as described above, at the small end of the connecting rod, the rod rocks back and forth a few degrees in relationship with the piston for each crankshaft revolution.

Figure 1A:
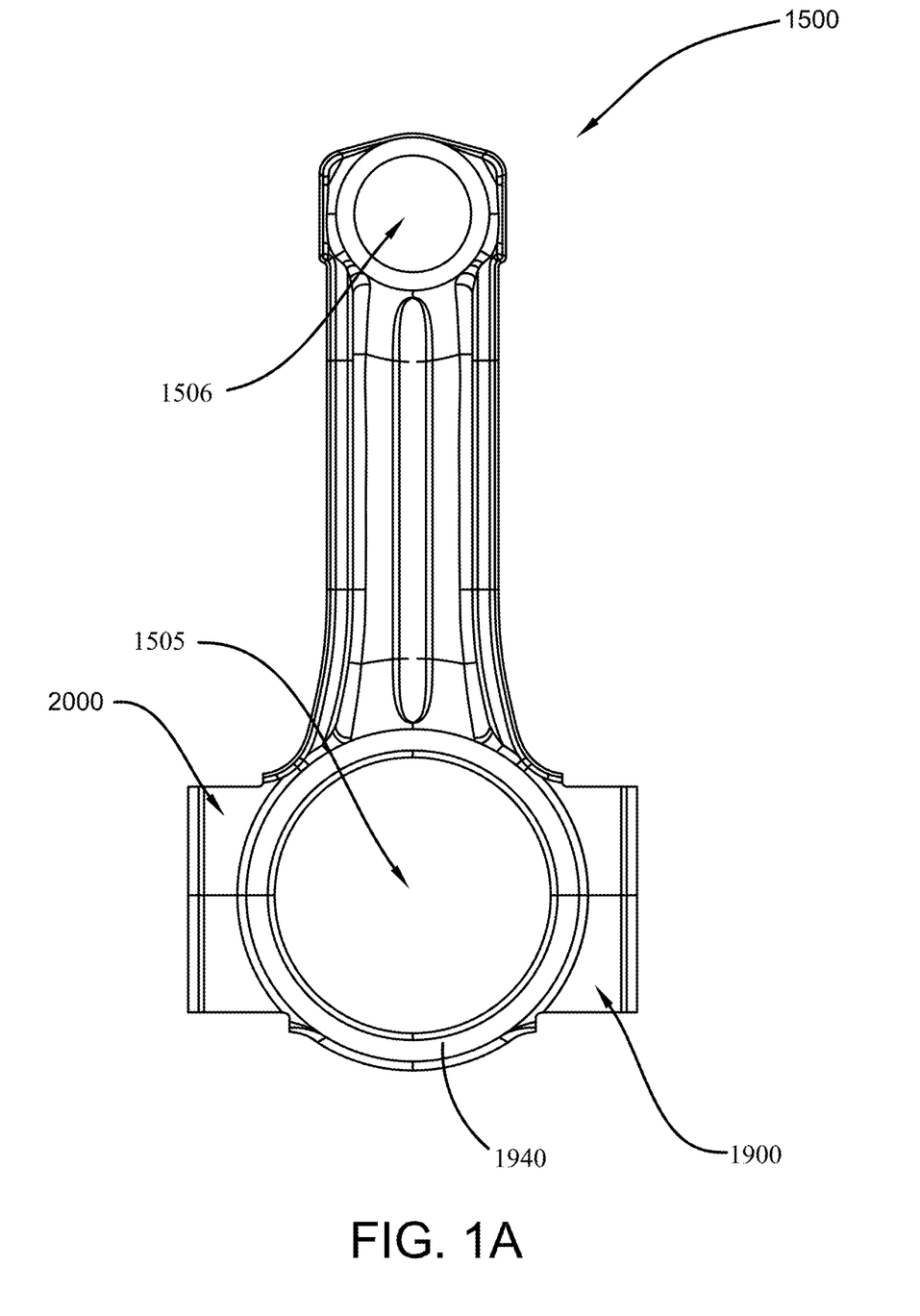
FIG. 1A is a component diagram illustrating an example implementation of a connecting rod.
Figure 1B:
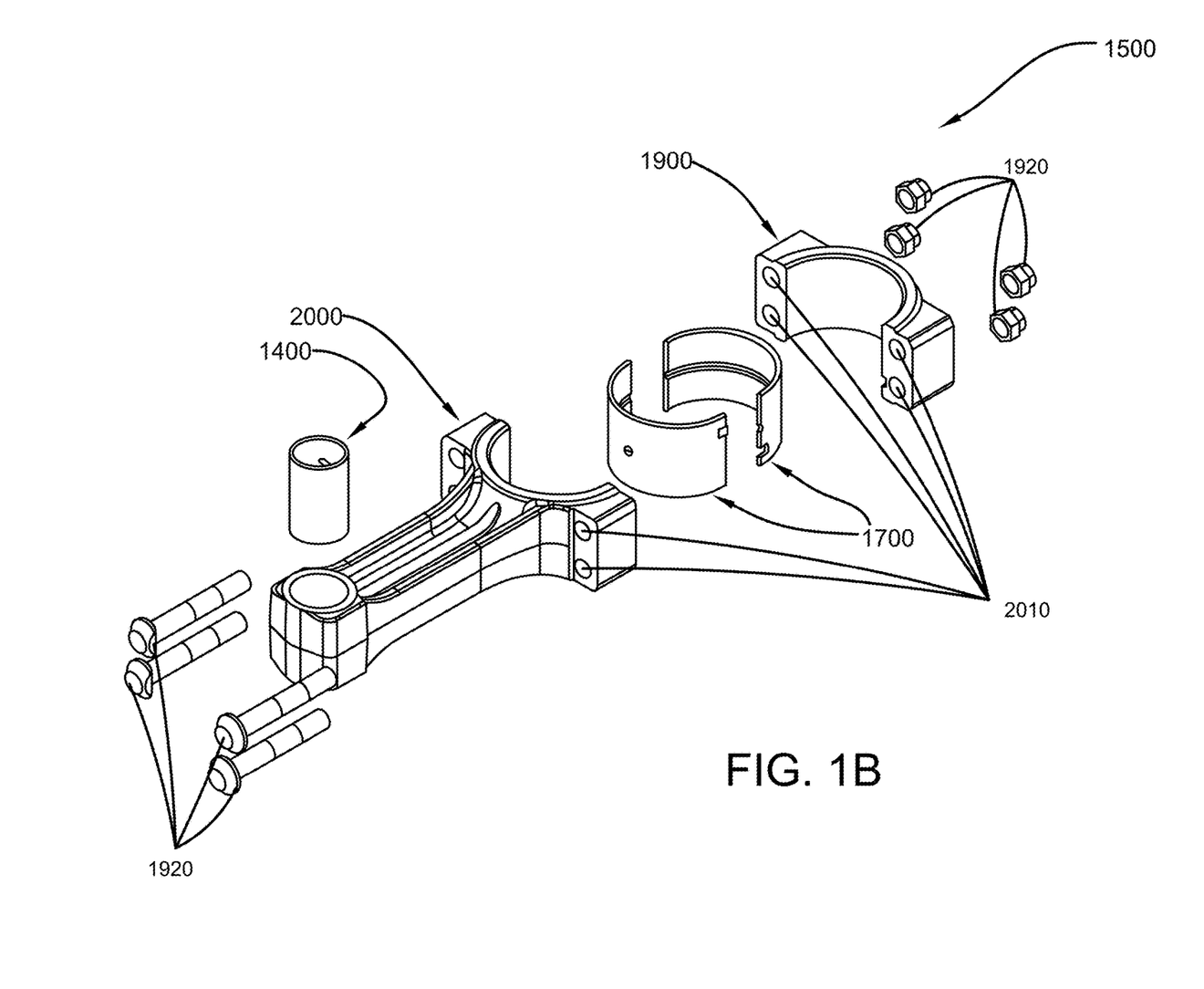
FIG. 1B is a component diagram illustrating an example implementation of a connecting rod in exploded view.
Figure 2A:
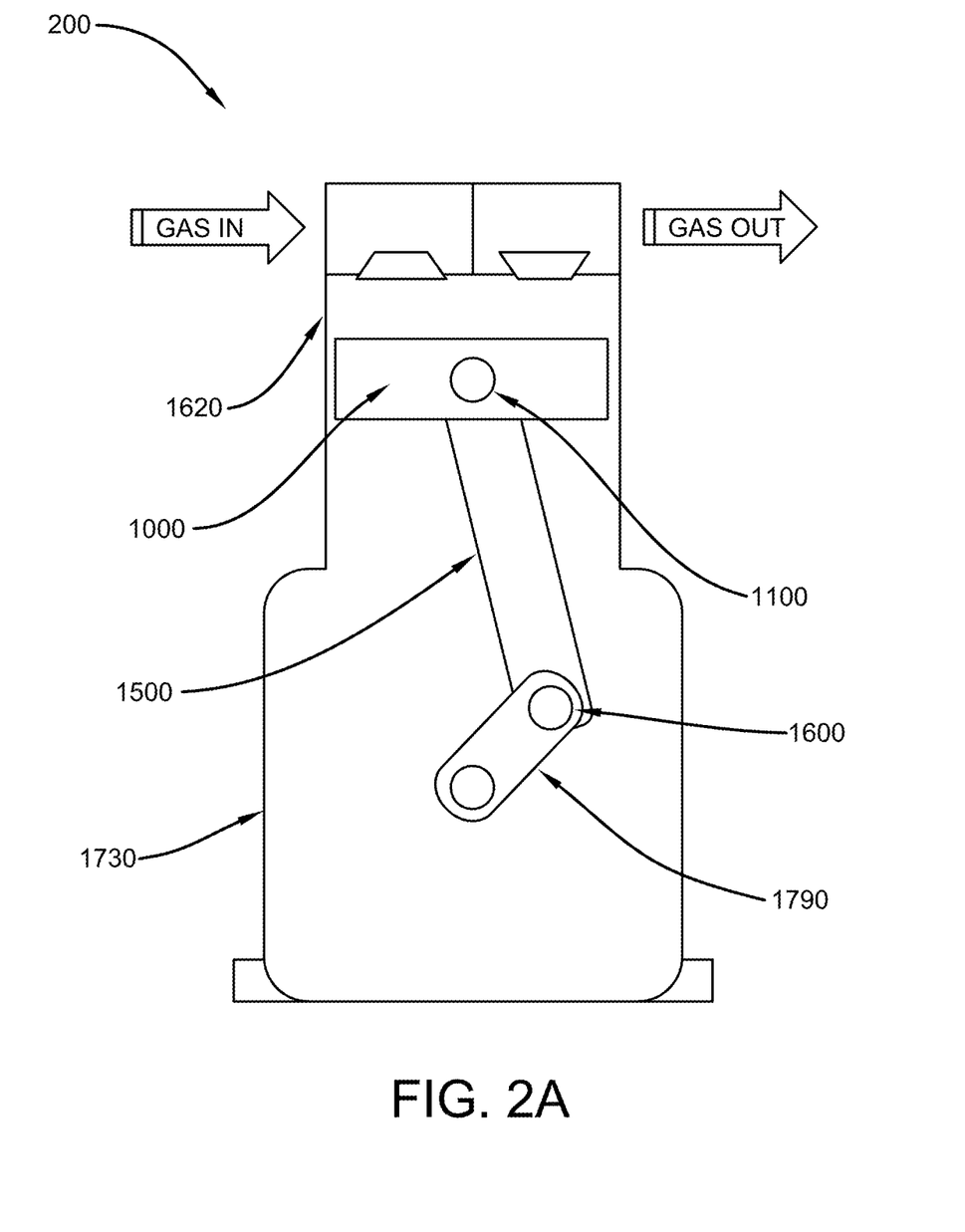
FIGS. 2A and 2B are component views of an example implementation of a compressor in operation.
Figure 2B:
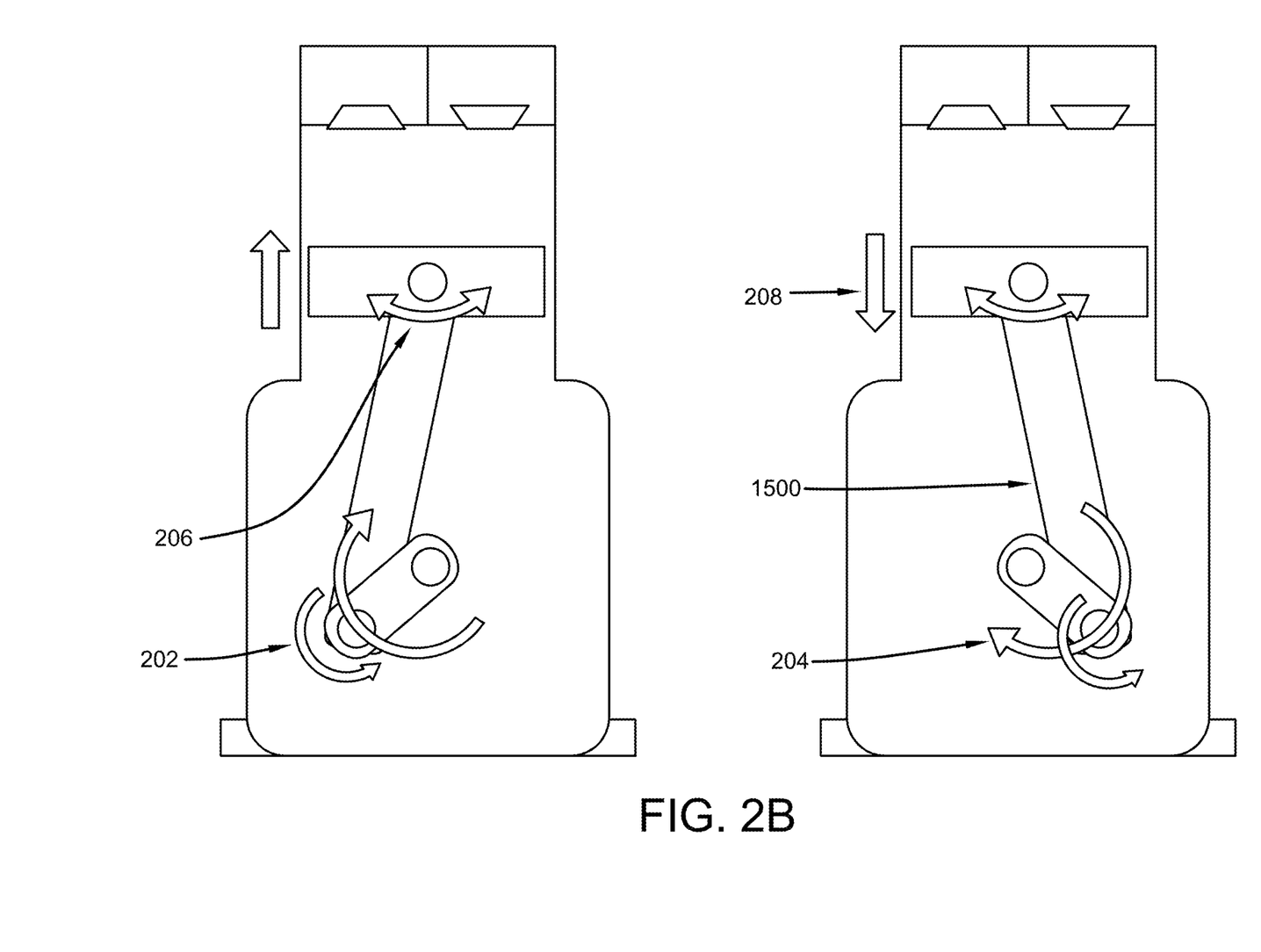
Figure 3A:
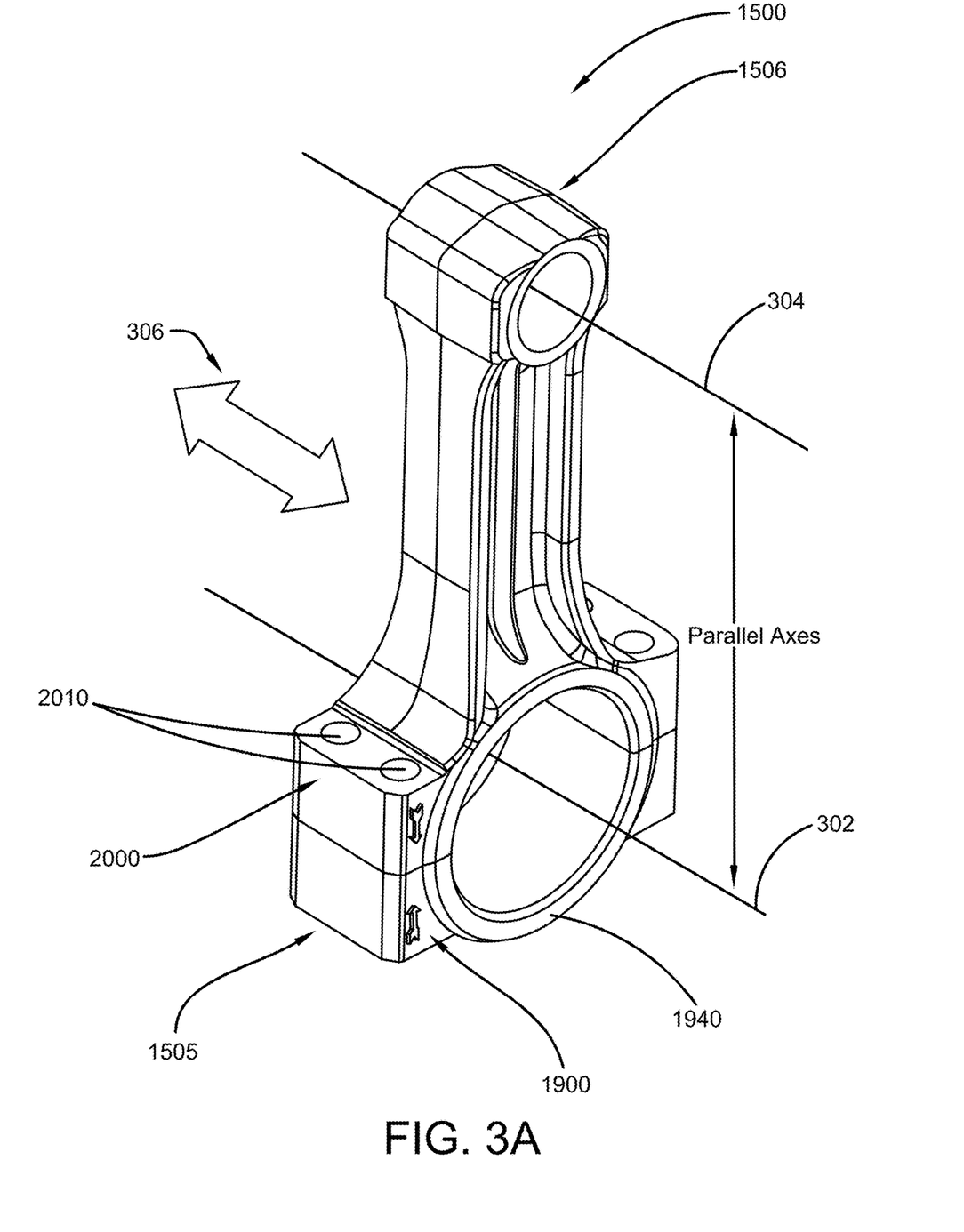
FIGS. 3A and 3B are component views of an example implementation of a connector rod and crankshaft.
Figure 3B:
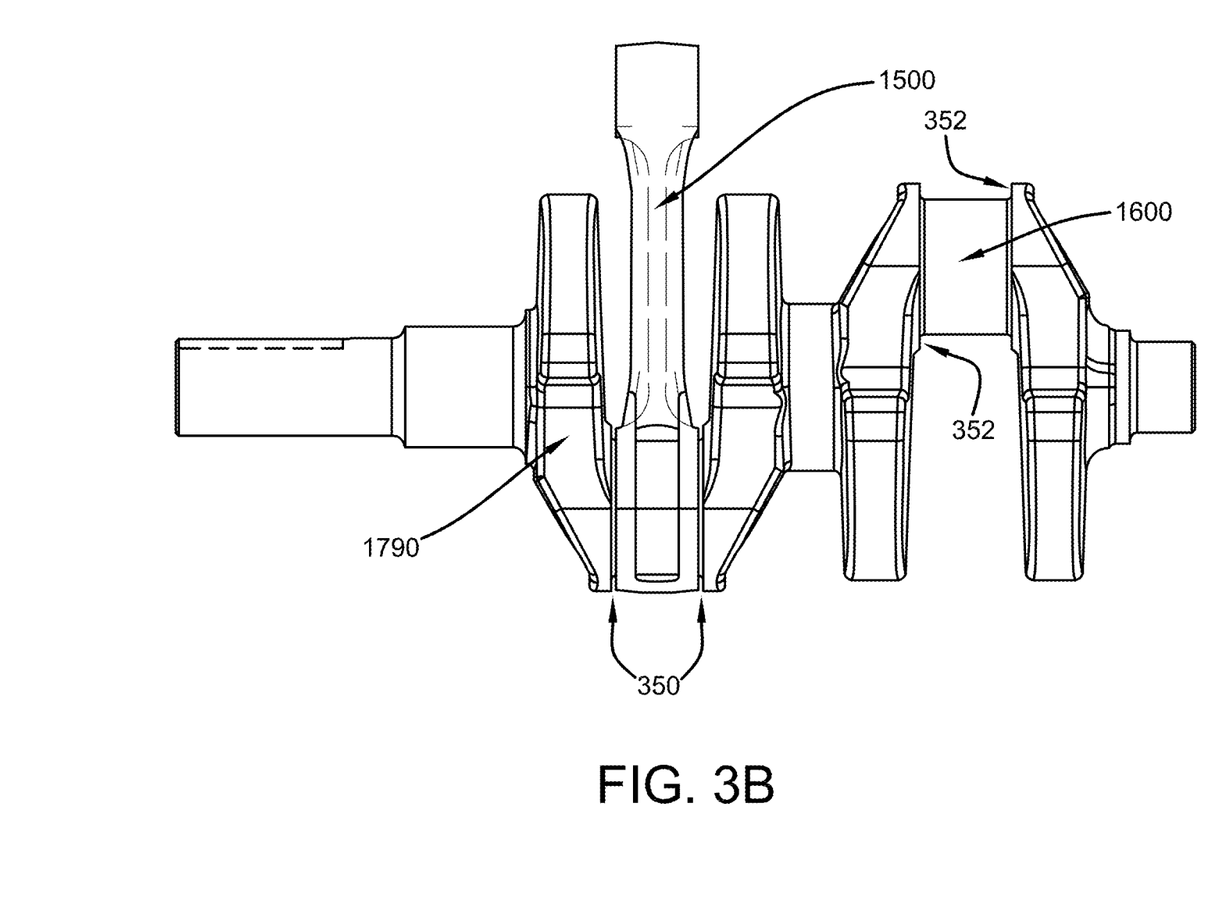
Figure 4:
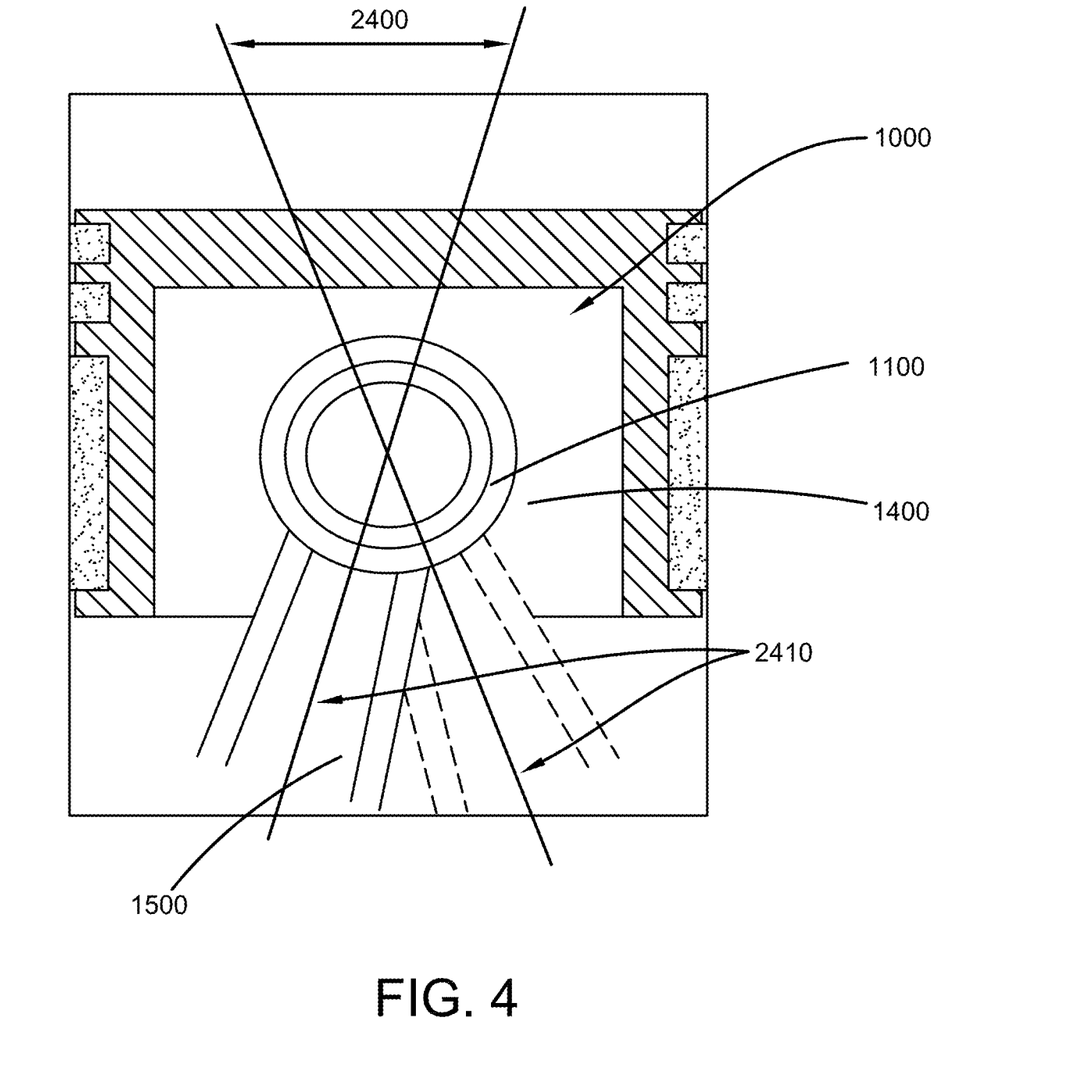
FIG. 4 is a component diagram illustrating a partial cut away view of a connecting rod implemented in conjunction with a piston.

For example, as illustrated in FIG. 4, depending on the stroke length (e.g., length of piston translation in cylinder of compressor or engine) and connecting rod 1500 length, the rocking motion 206 of the small end 1506 at/on the wrist pin 1100 might typically be 20° to 30° of motion 2400 back and forth, for a total travel of 40° to 60° of motion for each crankshaft revolution. In some implementations, the reciprocating connecting rod 1500 may be restricted or limited in travel, by connecting rod travel limits 2410, to an arc 2400 no greater than 90 degrees, with a typical range between 10 and 40 degrees. The arc 2400 is measured from the axis 304 of the wrist pin 1100. The velocity of the connecting rod 1500 in relation to the piston 1000 is related to this rocking motion 206. The two parts (connecting rod and piston) turn in relation to one another (e.g., 20° to 30°), stop, then return the (e.g., 20° to 30°) back to the original starting point. This back and forth motion 206 happens once per revolution of the crankshaft 1790.

In contrast, as described above, the big end 1505 of the connecting rod 1500 is constantly turning 202 in the same direction (e.g., clockwise) in relation to the crankshaft 1790. In one revolution 204 of the crankshaft 1790, the two parts (crankshaft and big end) travel 360° in relation to one another. Thus, the relative velocity of the connecting rod 1500 to the piston 1000 is much lower than the relative velocity of the connecting rod 1500 to the crankshaft 1790. This velocity difference is even greater when consideration is given to the fact that the crankshaft journal 1600 diameter is typically considerably larger than the diameter of the wrist pin 1100. The "travel distance" around the larger journal 1600 is much greater than that of the smaller wrist pin 1100.

In this way, in this innovation, by locating the axial positioning function of the connecting rod 1500 at the small end 1506 of the rod 1500 rather than at the big end 1505 of the rod 1500, the sliding motion 306 between the two parts that position the connecting rod 1500 axially can be lessened. This may be more important in an oil-less design where the contacting parts have no oil lubrication available. Thus, the innovation, described further below, introduces guide washers to mitigate metal to metal contact between the piston 1000 and the connecting rod 1500 at the small end 1506.

Figure 5:
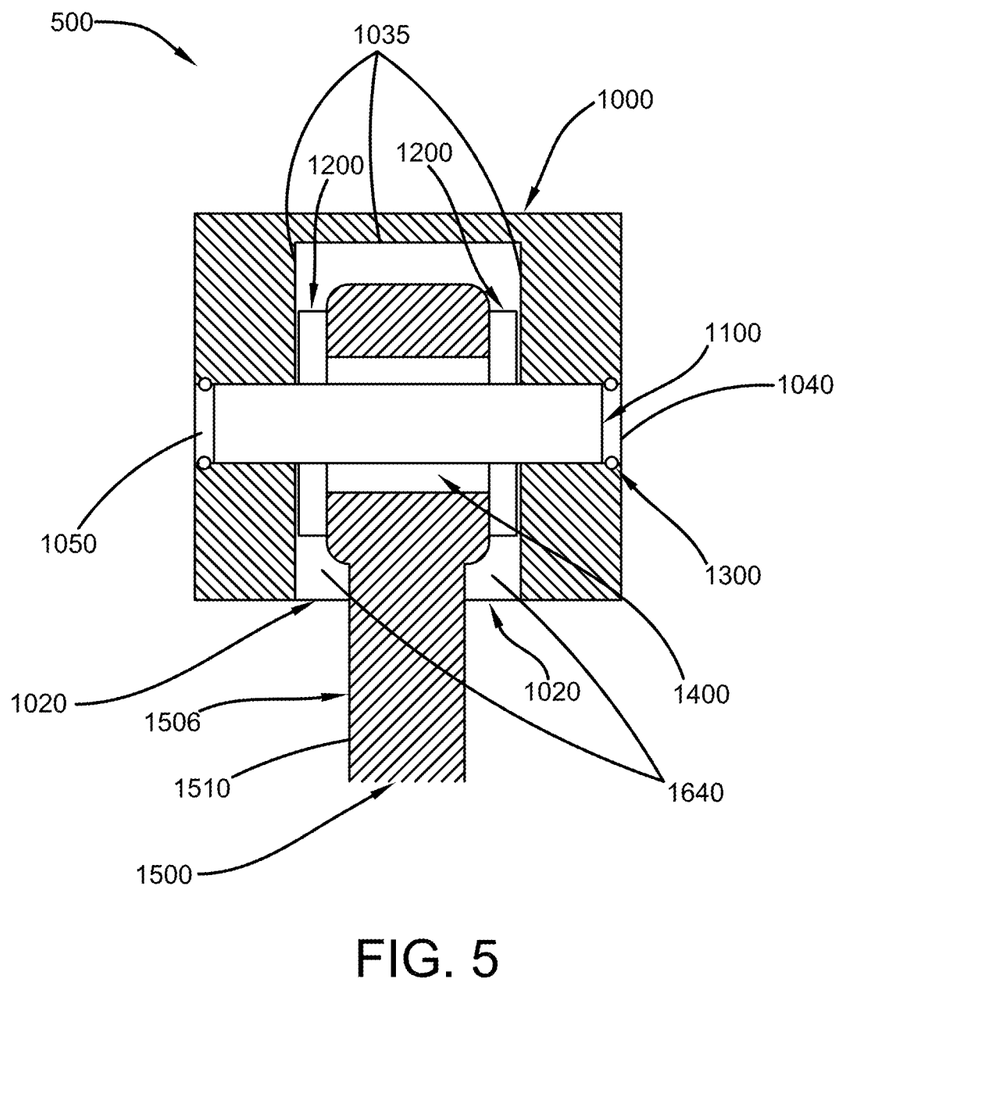
FIG. 5 is a component diagram illustrating a different partial cut away view of one or more portions of one or more systems described herein.
Figure 6A:
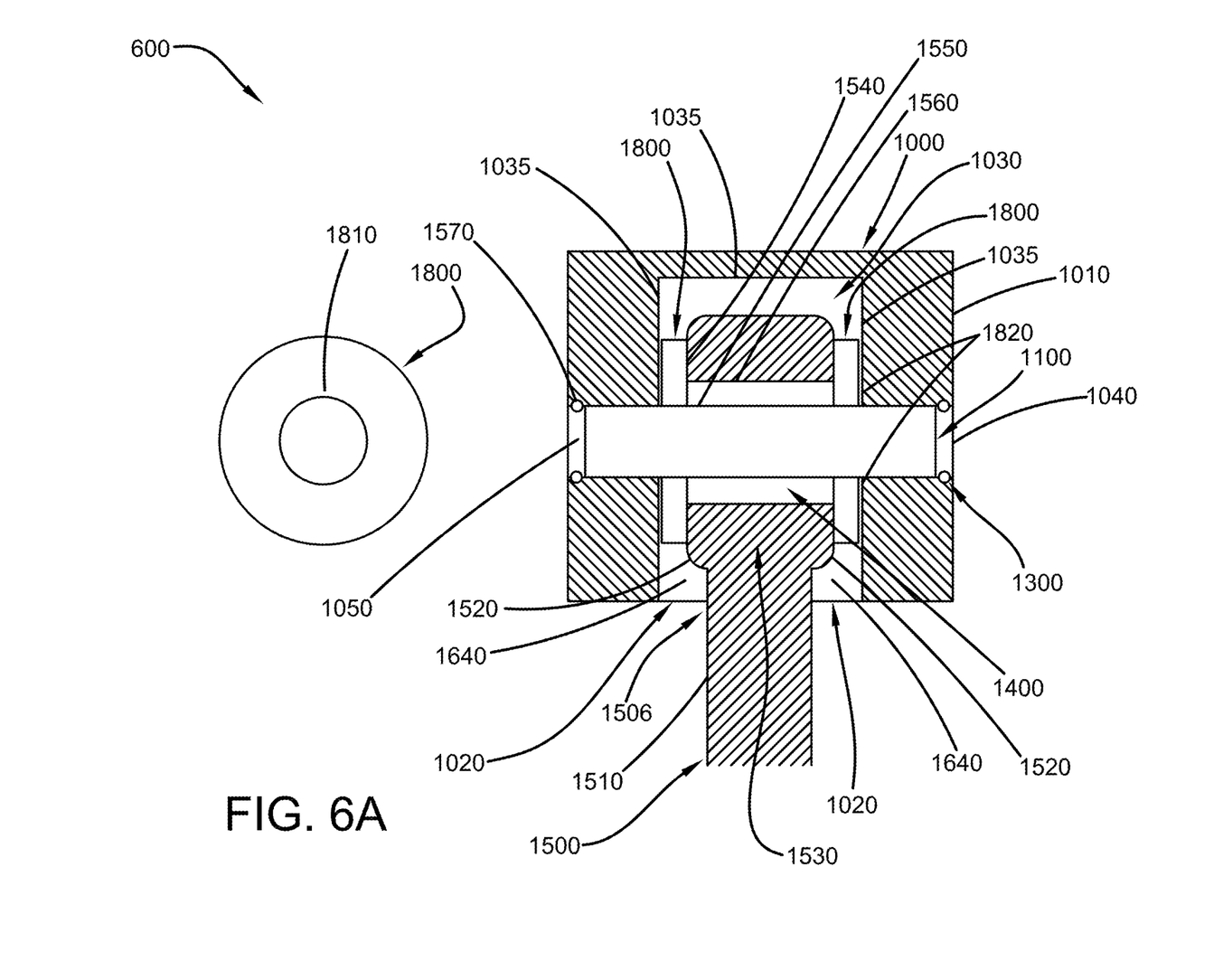
FIGS. 6A and 6B are component views of different example implementations, in partial cut away view, of one or more portions of one or more systems described herein.
Figure 6B:
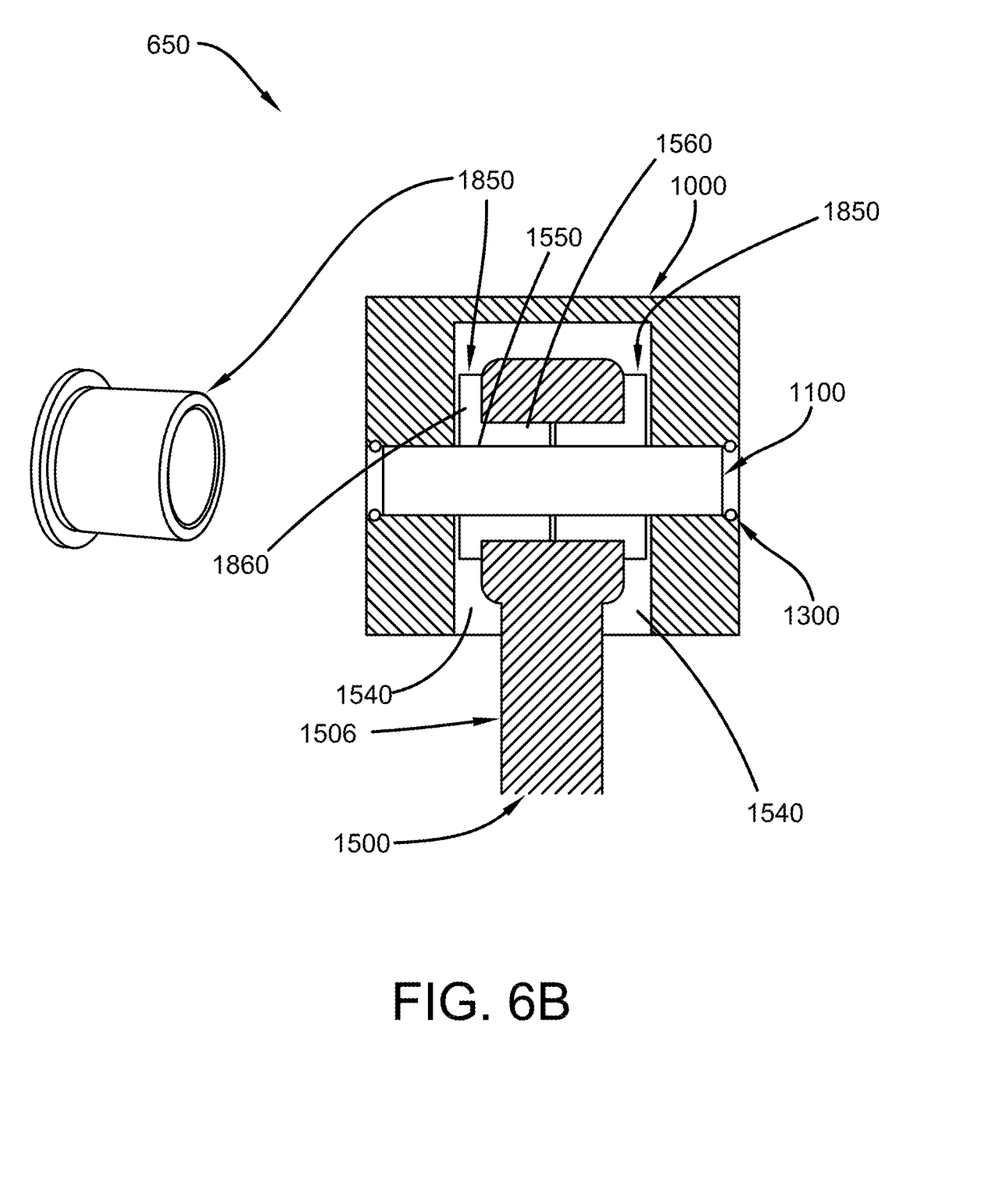
Figure 7:
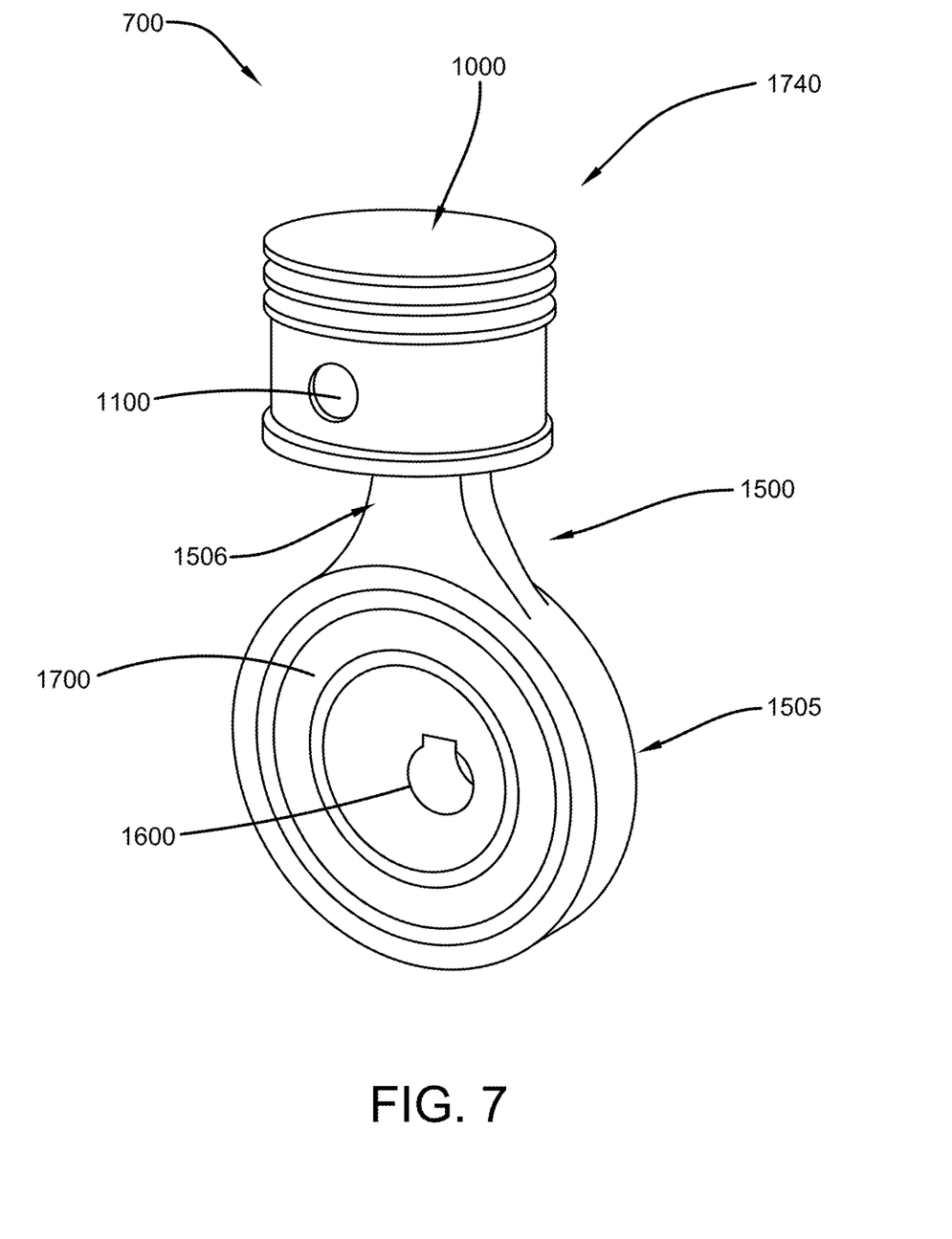
FIG. 7 is a component diagram illustrating one implementation of one or more portions of one or more systems described herein.

FIGS. 5-7 illustrate various implementations of a connecting rod positioning guide apparatus, utilizing the innovations described herein. The apparatus integrates a number of components for improved alignment, improved performance and longevity, improved simplicity, reduced cost, improved interchangeability, and reduced assembly and machining time. The system may comprise one or more of the following features, which are further described herein.

In one implementation of the present disclosure, as illustrated in FIG. 5, with continued reference to FIGS. 1-4, a mechanical assembly 500 may comprise a connecting rod 1500 with a first (e.g., big) end 1505 and a second (e.g., small) end 1506, a crankshaft journal 1600, a wrist pin 1100, and at least one guide spacer 1200. The crankshaft journal 1600 may be coupled to the first end 1505 of the connecting rod 1500, allowing for the transmission of rotational forces. The wrist pin 1100 may be configured to attach to the second end 1506 of the connecting rod 1500, facilitating the transfer of mechanical motion. At least one guide spacer 1200 can be disposed on the wrist pin 1100, located on either side of the connecting rod 1500 at the second end 1506. The at least one guide spacer 1200 can be engaged with, and disposed between, the second end 1506 of the connecting rod 1500 and piston 1000 (e.g., a wall of an inner cavity of the piston), which can provide for alignment/positioning of the connecting rod 1500, along with reduced wear, and other benefits described herein. The crankshaft journal 1600 and the wrist pin 1100 may be arranged in parallel, as illustrated in FIG. 3A, thereby enabling the connecting rod 1500 to perform both rotational 202 and reciprocating 208 motions, and provide the appropriate positioning of the connecting rod, while mitigating the sideways slide 306.

As illustrated, in some implementations, the mechanical assembly 500 may comprise a piston 1000 with an outside surface 1010, a first piston opening 1020 disposed on the outside surface 1010, wherein the first piston opening 1020 defines an elongate inner cavity 1030 with an inner surface 1035. The piston may further comprise a plurality of axially aligned apertures 1040 disposed on the outside surface 1010 each defining an elongate wrist pin bore 1050 for holding a wrist pin 1100, wherein the wrist pin 1100 is pivotally coupled to a connecting rod 1500, and wherein the piston 1000 is removably coupled to the wrist pin 1100 by at least one retainer element 1300 (e.g., fastener, retaining clip, retaining ring, etc.).

In some implementations, the connecting rod 1500 may comprise a first end 1505, a second end 1506, a neck 1510 connecting the first end 1505 to the second end 1506, wherein the second end comprises at least one shoulder 1520 disposed along at the distal end of the neck 1510, wherein a terminal portion 1530 of the second end 1506 is disposed at a distal end of the at least one shoulder 1520, and wherein the geometry of the at least one shoulder 1520 transitions into the terminal portion 1530 of the second end 1506. In some embodiments, the at least one shoulder 1520 may comprise a sloped geometry, including without limitation: a fillet, chamfer, bevel, or other similar variation thereof.

Further, the terminal portion 1530 of the second end 1506 of the connecting rod 1500 may be disposed within the elongate inner cavity 1030. The terminal portion 1530 may further comprise an elongate connecting rod aperture 1540 wherein the elongate connecting rod aperture 1540 extends through the terminal portion 1530 of the second end of the connecting rod 1500 and is in axial alignment with the plurality of axially aligned apertures 1040 of the piston 1000 such that the wrist pin 1100 may be insertable through the plurality of axially aligned apertures 1040, through the elongate wrist pin bore 1050, and through the connecting rod aperture 1540. In some implementations, the wrist pin 1100 may further comprise a wrist pin bearing 1400 partially surrounding an outer surface 1550 of the wrist pin 1100, wherein the wrist pin bearing 1400 is partially surrounded by an inner surface 1560 of the elongate connecting rod aperture 1540, wherein the wrist pin bearing 1400 is arranged between the wrist pin 1100 and the connecting rod.

In further implementations, the retainer element 1300 may fit into a groove 1570 disposed at the end of the wrist pin bore 1050. The retainer element 1300 may be a circular or semi-circular ring held in tension within or around the groove 1570 wherein the outward tension prevents the clip from loosening or slipping out of place during operation. The retainer element 1300 thickness and diameter may be precisely fitted to the dimensions of the groove to ensure a stable fit. The retainer element may comprise an inner curvature which corresponds to a curvature of the outer surface 1550 of the wrist pin 1100, while the outer curvature aligns with the groove in the bore 1050. The retainer element 1300 may be circular or semi-circular, with a gap allowing it to be compressed for installation. During installation, the retainer element 1300 may be positioned in the groove wherein the retainer element 1300 expands, exerting an outward force to hold the wrist pin 1100 firmly in place, preventing it from sliding out and ensuring the piston 1000 pivots correctly during operation. The retainer element 1300 may be of various types including but not limited to C-clips, E-clips, and spiral clips. The retainer element 1300 may be made of a strong, resilient material such as steel or titanium, used to maintain the integrity of the piston-connecting rod assembly.

A plurality of guide spacers 1200 may be disposed around the wrist pin 1100 and between the inner surface 1035 of the elongate inner cavity 1030 and a first surface of the terminal portion 1530 of the connecting rod for improved alignment of the connecting rod 1500 and wrist pin 1100 and to reduce wear. In some implementations, a wrist pin bearing 1400 can be disposed between the wrist pin 1100 and a connecting rod 1500, which can facilitate smooth movement by providing a low-friction, wear-resistant surface for the wrist pin 1100 to pivot against, thus allowing the piston 1000 to move efficiently without excessive friction wear and heat. The wrist pin bearing 1400 may take the form of a bronze bushing (e.g., or other suitable materials such as brass, polymers, etc.), a more complex needle roller bearing, a plain bearing, a composite bearing, a sintered metal bearing, a ball and roller bearing, a self-lubricating bearing or other similar bearing.

In one implementation of the mechanical assembly 600, illustrated in FIG. 6A, one or more guide washers 1800 can be disposed at the second end or small end 1506 of the connecting rod 1500. The guide washer(s) 1800 may be flanking or positioned on either side of the connecting rod 1500 at the second end 1506. The guide washer(s) 1800 may be composed of a composite material, carbon, or other suitable self-lubricating material, such as a polymer, or other non-metallic material. The guide washer(s) 1800 may be annular-shaped, which may have an inner aperture 1810 configured to accommodate a fastening element such as bolt or a wrist pin 1100. The washer geometry may be defined by an outer diameter, inner diameter, and thickness. The washer 1800 may comprise a circular outer circumference, providing for relatively uniform distribution of load across its surface. The inner aperture 1810 may be concentric with the outer diameter, configured to closely fit around the wrist pin 1100, limiting movement and wear. In further embodiments, the inner aperture 1810 may be a different shape or size corresponding to fit around with the specific geometry of the wrist pin 1100 or another similar fastener. The thickness of the washer 1800 may vary to provide sufficient strength while reducing bulk. The thickness can range in size from 0.5 mm to 3 cm or more. This may improve its effectiveness in load distribution and protection of the washer contact surfaces 1820.

In other implementations, the guide washer(s) 1800 may be rectangular, triangular, hexagonal or other geometric shape. In another implementation of the current disclosure, a single continuous washer brace further comprising two axially aligned apertures may be positioned on either side of the connecting rod 1500 at the second end 1506.

In some implementations, the guide washers 1800 may incorporate a composite layering structure, combining multiple materials to enhance performance. For example, a core layer of high-strength steel may be sandwiched between outer layers of self-lubricating polymers. This design leverages the strength of metal with the low-friction properties of polymers, resulting in a guide washer 1800 that can withstand high loads while minimizing friction and wear. The composite structure may also include embedded fibers or reinforcements to further enhance mechanical properties.

Moreover, the guide washers 1800 may be designed with micro-textured surfaces to improve lubrication retention. These micro-textures may consist of tiny grooves or dimples that trap lubricant, ensuring a consistent lubrication film between the moving parts. This feature can significantly reduce the coefficient of friction and prevent metal-to-metal contact, thereby extending the service life of the components.

In another implementation, the guide washer 1800 may have an inside diameter slightly larger than the outside diameter of the wrist pin 1100. This configuration may allow for reduced friction and wear caused by rubbing friction between the guide washer 1800 and the wrist pin 1100 (e.g., because the contact between the two is reduced). This also enhances the durability and efficiency of the mechanical assembly by increasing the operational life of the guide washer 1800 due to the reduced friction.

In alternate implementation, as illustrated in FIG. 6B, the mechanical assembly 650 may instead comprise a one or more flanged wrist pin bushings 1850 rather than wrist pin bearings 1400. The flanged wrist pin bushings 1850 can be disposed at the small second end 1506 of the connecting rod 1500 to mitigate the connecting rod 1500 from directly contacting the piston 1000 and the wrist pin 1100. The flanged wrist pin bushings 1850 can partially surround an outer surface 1550 of the wrist pin 1100, wherein the wrist pin bushings 1850 are partially surrounded by an inner surface 1560 of the elongate connecting rod aperture 1540. The wrist pin bushings 1850 are arranged between the wrist pin 1100 and the connecting rod 1500. Such components may be constructed out of self-lubricating material, which can reduce wear and maintenance requirements, as described above for the washer material.

As described above, the bushings 1850 can be strategically positioned on either side of the connecting rod 1500 at the second end 1506 within the piston cavity 1540. Each bushing 1850 may feature an annular shape, with an inner sleeve aperture configured to fit securely around elements such as a wrist pin 1100. This implementation of the bushings 1850 can help provide improved alignment and stability to the connecting rod 1500, for smooth operation, while mitigating a sliding motion 306. The inner aperture of the bushings 1850 may be calibrated to match the dimensions of the wrist pin 1100 or other fastening elements, to provide a secure and wear-resistant fit. The bushing 1850 may further comprise an outer sleeve configured to partially surround the inner sleeve, wherein part of the outer sleeve interfaces or is in contact with the connecting rod 1500. In this implementation, integrated within this assembly, between the inner and outer sleeves, a lubrication material may be present, which can be selected to reduce friction and wear, thereby enhancing the bushing's longevity and efficiency. In certain embodiments, a flange 1860 may extend radially from one end of the bushing 1850, providing axial positioning and increased surface area for load distribution.

As illustrated in FIG. 7, with continued reference to FIGS. 1-4, in some implementations of the present disclosure, a mechanical assembly 700 for motion conversion may comprise a connecting rod 1500 with a first end 1505 and a second end 1506. The first end 1505 of the connecting rod 1500 may be coupled to a crankshaft journal 1600 at a journal bearing 1700 in a crankcase (e.g., 1730 as seen in FIGS. 2A and 2B), while the second end 1506 may be coupled to a wrist pin 1100. The crankshaft journal 1600 and the wrist pin 1100 may be configured such that the crankshaft journal axis 302 of rotation is parallel to the axis 304 of rotation of the wrist pin 1100, allowing for rotational 202 and reciprocating 206 motion of the connecting rod 1500. In such an implementation, the connecting rod 1500 may be formed as a single piece 1740. The single piece 1740 may connect the piston 1000 to the crankshaft journal 1600. The single piece 1740 may have a first end 1505, wherein the first end is coupled to a crankshaft journal 1600. The single piece may also have a small second end 1506, wherein the second end 1506 is coupled to the wrist pin 1100. The single piece in this implementation may be configured to convert the rotational motion 204 of the crankshaft 1790 into reciprocating motion at the wrist pin 1100. The single piece may be linked to a piston 1000, the piston 1000 configured to transmit forces from the piston 1000 to the crankshaft journal 1600 as the piston 1000 reciprocates. In a further implementation the mechanical assembly 700 may be particularly suited for use in compressors or engines. In this implementation, the crankshaft journal 1600 may be coupled or secured to a crankshaft 1790, while the small second end 1506 engages with the wrist pin 1100, facilitating the conversion of rotational motion 204 into reciprocating translational motion 208.

In another implementation, the mechanical assembly may include a damping mechanism integrated within the connecting rod 1500 to absorb vibrations and reduce mechanical stress during operation. This damping mechanism may be composed of viscoelastic materials or incorporate hydraulic damping chambers that adjust to the dynamic loads experienced by the connecting rod 1500. By mitigating vibrations, the assembly may enhance the overall efficiency and longevity of the engine or compressor, leading to smoother performance and reduced wear on connected components.

As illustrated in FIGS. 1-4, in some implementations, the connecting rod 1500 may further comprise a first shell cap 1900 located at the first end 1505 and a second shell base 2000 located at the first end 1505, wherein the first shell cap 1900 and second shell base 2000 may be releasably coupled using a plurality of fasteners 1920. The connecting rod 1500 may be constrained on the crankshaft journal 1600 by a plurality of contacting shoulders 1940, wherein the plurality of contacting shoulders 1940 position the connecting rod 1500 axially. In such implementations the connecting rod 1500 may be removed from the crankshaft journal 1600 in order to replace or remove the contacting shoulders 1940 or for other maintenance of the connecting rod or crankshaft journal. In a further implementation, the wrist pin bearing 1400 and the journal bearing 1700 may be self-lubricating or configured to receive grease through a refillable grease fitting 1960 through a lubrication port 1970, from an internal lubrication reservoir 1980 (1960, 1970, 1980 not labeled in the figures).

As illustrated in FIG. 7, with continued reference to FIG. 1-4, in another implementation of the present disclosure, the connecting rod 1500 may be configured (e.g., formed or constructed) as a single piece 1740 with spacers 1200, which can mitigate the use of first shell cap 1900 and second shell base 2000 at the first end 1505. In this implementation, replacement of the contacting shoulders at the crankshaft journal 1600 may not be needed due to the motion already being limited by the spacers 1200 or washers 1800 positioned on the second end 1506. As such, this design can simplify manufacturing and assembly processes, potentially reducing costs and increasing reliability. This feature may also reduce machine assembly time because of the simplification and corresponding reduction of components originally used to remove or attach a split connecting rod from a crankshaft journal. Further the simplification into a single piece 1740 design also reduces the machining necessary to craft the single piece because it eliminates the need for a split connecting rod and the assembly to allow the end to be attached and detached from the crankshaft journal 1600.

In further implementations, the connecting rod 1500 may be free to move axially on the crankshaft journal 1600. Because the connecting rod 1500 may be free to move axially on the crankshaft journal 1600, one implementation of the connecting rod 1500 may be a single piece 1740 without a separate cap 1900. The cap 1900, described herein, can be made with several precise machining operations, involving drilling and facing the bolt holes 2010, cutting the connecting rod in two pieces, finishing the mating surfaces, reassembling the connecting rod, finish machining of the bearing bore with the two parts assembled and torqued, then removing the cap 1900 again for assembly into a compressor (e.g., engine, or other suitable machine). The described simplification extends to a reduction in assembly time as well, because the technician has fewer parts to assemble and avoids the step of bolting together the connecting rod 1500 and installing the cap 1900 around the crankshaft journal 1600 and torquing the bolts to a specified torque. Because the connecting rod 1500 is free to move axially on the crankshaft journal 1600, the connecting rod 1500 may be slipped over the crankshaft journal 1600 or vice versa, while the rod positioning is maintained at the small end 1506 by the guides 1200.

In a further implementation, the mechanical assembly may include a real-time monitoring system equipped with sensors 2500 (not pictured) to track the operational parameters of the connecting rod 1500 and associated components. These sensors can measure variables such as temperature, stress, vibration, and wear. Data collected by the sensors 2500 can be transmitted to a central processor or control unit 2600 (not pictured), enabling predictive maintenance and early detection of potential failures to minimize downtime and reduce maintenance costs.

The mechanical assembly may be further enhanced by incorporating advanced manufacturing techniques such as additive manufacturing or 3D printing for the production of complex components like the connecting rod 1500 and guide spacers 1200. Additive manufacturing allows for intricate internal geometries, such as lattice structures within the connecting rod 1500, which can reduce weight while maintaining structural integrity. This weight reduction can lead to improved engine efficiency and responsiveness.

In some implementations, the wrist pin 1100 and guide washers 1800 may be treated with surface coatings such as titanium nitride or ceramic-based coatings. These coatings enhance hardness, reduce friction, and provide resistance to corrosion and high temperatures. The application of such coatings can be particularly beneficial in high-performance engines or compressors operating under extreme conditions.

In one implementation, the assembly may comprise guide washers 1800 that may be made of self-lubricating materials, such as some polymers, which can help reduce friction. In this implementation, the guide washers 1800 may be composed of a polymer, composite material, carbon, or similar self-lubricating substance. Further, the washer 1800 may be configured to fit over the wrist pin 1100 with a slip fit. In this configuration, integrated into this design, the inside diameter of each washer 1800 may be close in size to the outside diameter of the wrist pin 1100, providing a fit that is snug yet movable. A washer 1800 may be positioned on each side of the connecting rod 1500, to reduce the amount of travel of the connecting rod 1500. Within the piston 1000, the interior space may accommodate the width of the connecting rod's small second end 1506, alongside the two washers 1800, plus additional internal gap clearance 1640 to allow free movement of the connecting rod 1500 relative to the piston 1000 to mitigate binding. Such a configuration, with the piston 1000 confined within a cylinder 1620, provides positive axial location of the connecting rod 1500, and helps maintain the appropriate alignment and movement of the connecting rod 1500 within the mechanical system (e.g., providing for the connecting rod 1500 to be properly positioned and maintained along its axial direction).

In another implementation, the guide washers 1800 or flanged bushings 1850 may comprise wear indicators 2100 (not depicted in figures). These indicators 2100 may provide visual, audible, or tactile signals to the user, indicating when the washers 1800 or bushings 1850 need replacement due to wear. For example, such wear indicators may utilize a specific coloring, a sound-inducing layer wherein the sound layer creates noise when exposed during operation, or a pattern on the guide washers 1800 wherein the pattern or coloring is designed to fade or change to demonstrate cyclical yield deformation. Furthermore, the bushings 1850 may be self-lubricating be configured with a grease port 1950 to receive grease via a refillable grease fitting 1960 through a lubrication port 1970, from internal lubrication reservoir 1980 (1960, 1970, 1980 not labeled in the figures).

In a further implementation, the mechanical assembly may be configurable for different types of engines or compressors. This configurability could include adjustable lengths or angles of the connecting rod 1500, or interchangeable components such as different sizes or types of guide washers 1800 or flanged bushings 1850.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A connecting rod assembly, comprising:
    a connecting rod comprising a first end and a second end:
        wherein the first end is sized and shaped for operational coupling with a journal of a crankshaft; and
        wherein the second end is engaged with a wrist pin disposed in a piston;
    a guide washer disposed at the second end on the wrist pin between, and engaged with, the second end of the connecting rod and the piston, resulting in the alignment of the connecting rod on the wrist pin, wherein the guide washer comprises a flanged bushing, at least a portion of which is disposed between the wrist pin and the second end.

2. The connecting rod assembly of claim 1, comprising at least two guide washers respectively disposed on either side of the second end.

3. The connecting rod assembly of claim 1, wherein the guide washer comprises an inside diameter larger than an outside diameter of the wrist pin.

4. The connecting rod assembly of claim 1, wherein the guide washer comprises an annular shape having an outer diameter and an inner diameter, wherein the inner diameter is sized and shaped to receive the wristpin therethrough.

5. The connecting rod assembly of claim 1, wherein the guide washer comprises a self-lubricating material.

6. The connecting rod assembly of claim 1, wherein the guide washer comprises a composite material.

7. A connecting rod assembly, comprising:
    a body comprising a first end and a second end;
    the first end sized and shaped to operably engage with a crankshaft journal of a crankshaft;
    the second end sized and shaped to operably engage with a wrist pin in a piston; and
    a pair of guide washers comprising a flanged bushing, at least a portion of which is disposed between the wrist pin and the second end respectively disposed on either side of the second end when engaged with the wrist pin;
    wherein the body is configured to convert rotational motion of the crankshaft journal to a reciprocating motion at the wrist pin.

8. The connecting rod assembly of claim 7, wherein the guide washer comprises an inside diameter larger than an outside diameter of the wrist pin.

9. The connecting rod assembly of claim 7, wherein the guide washer comprises an annular shape having an outer diameter and an inner diameter, wherein the inner diameter is sized and shaped to receive the wristpin therethrough.

10. The connecting rod assembly of claim 7, wherein the guide washers are comprised of a self-lubricating material.

11. The connecting rod assembly of claim 7, wherein the guide washers are composed of a composite material.

12. The connecting rod assembly of claim 7, wherein the guide washers are composed of a carbon material.

13. The connecting rod assembly of claim 7, wherein the body is formed as a monolithic component.

14. A mechanical assembly for a compressor or engine, comprising:
    a connecting rod comprising a first end and a smaller second end;
    a crankshaft journal pivotably engaged with the first end; and
    a wrist pin pivotably engaged with the second end;
    wherein the wrist pin is pivotally engaged with a piston, and a pair of guide washers comprising flanged bushings configured to allow free movement of the connecting rod relative to the piston are disposed between the piston and the second end of the connecting rod.

15. The mechanical assembly of claim 14, wherein the connecting rod is free to move axially on the crankshaft journal.

16. The mechanical assembly of claim 14, wherein the guide bushings are made of a self-lubricating material.

17. The mechanical assembly of claim 14, wherein the connecting rod is formed as a monolithic body.

* * * * *